(12) United States Patent
Carusiello, Jr. et al.

(10) Patent No.: US 9,145,999 B2
(45) Date of Patent: Sep. 29, 2015

(54) SHEAR INCREASING SYSTEM

(75) Inventors: John G. Carusiello, Jr., Lemont, IL (US); Hank Reuser, Niles, IL (US)

(73) Assignee: Perma-Pipe, Inc., Niles, IL (US)

( * ) Notice: Subject to any disclaimer, the term of this patent is extended or adjusted under 35 U.S.C. 154(b) by 1310 days.

(21) Appl. No.: 12/994,932

(22) PCT Filed: May 28, 2009

(86) PCT No.: PCT/US2009/045488
§ 371 (c)(1),
(2), (4) Date: Nov. 29, 2010

(87) PCT Pub. No.: WO2009/148920
PCT Pub. Date: Dec. 10, 2009

(65) Prior Publication Data
US 2011/0146830 A1   Jun. 23, 2011

Related U.S. Application Data

(60) Provisional application No. 61/057,011, filed on May 29, 2008.

(51) Int. Cl.
*F16L 9/14* (2006.01)
*F16L 59/02* (2006.01)

(52) U.S. Cl.
CPC ............... *F16L 59/029* (2013.01); *Y10T 29/49* (2015.01)

(58) Field of Classification Search
USPC .................................. 138/104, 149, 146, 144
See application file for complete search history.

(56) References Cited

U.S. PATENT DOCUMENTS

| | | | | | |
|---|---|---|---|---|---|
| 3,903,928 | A | * | 9/1975 | Sykes et al. | 138/109 |
| 3,911,961 | A | * | 10/1975 | Peyton et al. | 138/113 |
| 4,345,430 | A | * | 8/1982 | Pallo et al. | 60/282 |
| 4,347,090 | A | | 8/1982 | Anderson et al. | |
| 4,351,366 | A | * | 9/1982 | Angioletti | 138/149 |
| 4,523,141 | A | * | 6/1985 | Thomas et al. | 324/557 |
| 4,611,635 | A | * | 9/1986 | Jarvis | 138/146 |
| 4,744,842 | A | * | 5/1988 | Webster et al. | 156/78 |
| 4,785,854 | A | * | 11/1988 | Jarvis et al. | 156/187 |
| 5,400,602 | A | * | 3/1995 | Chang et al. | 62/50.7 |
| 5,562,126 | A | * | 10/1996 | Briand et al. | 138/127 |
| 5,611,374 | A | | 3/1997 | Blin et al. | |

(Continued)

FOREIGN PATENT DOCUMENTS

DE            3741083 A1      6/1989

OTHER PUBLICATIONS

Perma-Pipe, Inc., International Search Report from PCT/US2009/045488, mailed Sep. 16, 2009 from the United States Patent and Trademark Office acting as International Searching Authority.

*Primary Examiner* — James Hook
(74) *Attorney, Agent, or Firm* — Nixon Peabody LLP

(57) ABSTRACT

A piping system employs a friction layer of windings, beads or pellets placed between insulation layers and/or on the outermost layer, that being the insulation layer if no jacket is employed or the jacket if it is employed. The windings, beads or pellets are wrapped or applied while the layer is uncured or warm so as to embed themselves into the surface and create a uneven, bumpy or undulating surface. The resulting product increases friction both internally and externally to better restrain or inhibit pipe movement in underground, marine, or subsea applications or provide restraint to the surrounding environment (earth, concrete, etc.).

2 Claims, 3 Drawing Sheets

(56) References Cited

U.S. PATENT DOCUMENTS

| | | | |
|---|---|---|---|
| 5,718,956 A * | 2/1998 | Gladfelter et al. | 428/35.9 |
| 5,787,655 A * | 8/1998 | Saylor, Jr. | 52/181 |
| 6,774,305 B2 * | 8/2004 | Wellman et al. | 174/51 |
| 7,220,470 B2 * | 5/2007 | Toas et al. | 428/35.7 |
| 8,201,584 B2 * | 6/2012 | Ito et al. | 138/143 |
| 8,371,338 B2 * | 2/2013 | Princell et al. | 138/149 |
| 2003/0183294 A1 | 10/2003 | Carlson | |
| 2004/0200536 A1 * | 10/2004 | Strasser et al. | 138/104 |
| 2006/0180227 A1 * | 8/2006 | Hummel et al. | 138/149 |
| 2008/0072988 A1 | 3/2008 | Elgendy et al. | |
| 2009/0320953 A1 * | 12/2009 | Fletcher et al. | 138/148 |
| 2010/0126618 A1 * | 5/2010 | D'Souza et al. | 138/149 |
| 2010/0263761 A1 * | 10/2010 | Niccolls et al. | 138/146 |

\* cited by examiner

SHEAR INCREASING SYSTEM

CROSS-REFERENCE TO RELATED APPLICATIONS

This application is a United States National stage application under 35 U.S.C. Section 371 of PCT/US2009/045488 filed May 28, 2009 which claims priority to U.S. Provisional Application No. 61/057,011 filed on May 29, 2008, both of which are hereby incorporated by reference as if fully set forth herein.

TECHNICAL FIELD

The present invention relates to insulation of pipes, and in particular, to increasing the friction between insulated pipes and their surrounding environment, such as underground, marine, or subsea pipes, to minimize pipe movement due to thermal expansion and contraction of the pipe caused by the temperature of the contents of the pipe and/or the temperature of the surrounding environment and/or due to loads encountered during handling and installation.

BACKGROUND OF THE INVENTION

Underground, marine, or subsea pipes carry fluids such as hot water, chilled water, cold liquefied gases, hot gas and hot oil. As a result, the pipes can naturally expand and contract due to the temperature of the fluids they are carrying. Expansion and contraction can also be caused by environmental (e.g., ground) fluctuations in temperature due to the season and weather conditions. In addition, loads encountered during handling and installation can cause movement between the pipe and insulation, jacket and coating layers.

The present invention is a system to increase the friction between the insulated pipe and its environment so as to minimize and/or prevent movement of the pipe relative to the surrounding ground or environment. A full discussion of the features and advantages of the present invention is deferred to the following detailed description, which proceeds with reference to the accompanying drawings.

SUMMARY OF THE INVENTION

One aspect of the invention is directed to a piping system using a friction layer of windings, pellets, or beads placed on the outermost layer, namely the insulation layer if no jacket is employed or the jacket if it is employed. The windings or beads are wrapped or applied while the outer layer is uncured or warm so as to embed themselves into the outer surface and create an uneven, bumpy, or undulating surface. The resulting product increases friction both internally and externally to better restrain and inhibit pipe movement.

Another aspect of the invention is directed to a piping system using a friction layer of windings, beads or pellets placed between insulation layers and/or the outermost layer, namely the outer insulation layer if no jacket is employed or the jacket if it is employed. The windings, beads or pellets are wrapped or applied while the layer is uncured or warm so as to embed themselves into the surface and create an uneven, bumpy or undulating surface. The resulting product increases friction both internally and externally to better restrain and inhibit pipe movement.

Several additional aspects of the invention will now be summarized with the understanding that one skilled in the art, ordinary or otherwise, would appreciated that the individual elements and physical and/or chemical characteristics thereof can be supplied individually or in any combination.

An aspect of the present invention is directed to a pipe for carrying fluid comprising a first insulation layer having an outer surface and a means for creating a non-smooth outer surface so as to increase the friction between the insulation and its environment. The means for creating a non-smooth surface may be a winding applied to and embedded in the outer surface while the insulation layer is curing or cooling. Alternatively, the means for creating the non-smooth surface may be a plurality of beads or pellets applied to and embedded in the outer surface while the insulation layer is curing.

A further aspect of the present invention, by itself, is directed to a pipe for carrying fluid comprising: a first insulation layer, a jacket over the insulation having an outer surface, and a means for creating a non-smooth outer surface so as to increase the friction between the insulation and its environment. The means for creating the non-smooth surface may be a winding applied to and embedded in the outer surface while the jacket layer is curing or cooling. The means for creating the non-smooth surface may further comprise a plurality of beads applied to and embedded in the outer surface while the jacket layer is curing or cooling.

A further aspect of the present invention is directed to a pipe for carrying fluid comprising: a first insulation layer consisting of single or multiple layers each with an outer surface and a means for creating a non-smooth outer surface so as to increase the friction between the insulation and its environment. The means for creating the non-smooth surface may be a winding applied to and embedded in the insulation outer surface(s) while the insulation layer is curing or cooling and/or comprise a plurality of beads or pellets applied to and embedded in the insulation outer surface(s) while the insulation layer is curing or cooling.

A further aspect of the present invention is directed to a pipe for carrying fluid comprising: a first insulation layer consisting of single or multiple layers each with an outer surface, a jacket over the insulation having an outer surface, and a means for creating a non-smooth outer surface so as to increase the friction between the insulation and its environment. The means for creating the non-smooth surface may be a winding applied to and embedded in the outer surface(s) while the insulation layer and/or jacket is curing or cooling and/or a plurality of beads or pellets applied to and embedded in the outer surface(s) while the insulation layer or jacket is curing or cooling.

A further aspect of the present invention is directed to a pipe for carrying fluid. The pipe comprises a tubular conduit, an environmental coating, a first insulation layer, a protective jacket, and a third layer. The tubular conduit defines a passageway for fluid flow and has an outer sidewall surface. The environmental coating is deposited on the outer sidewall for providing resistance against an environmental factor. The first insulation layer is deposited about the tubular conduit and the environmental coating. The first insulation layer is produced from a material selected from a group consisting of polyurethane foam, glass syntactic polyurethane, glass syntactic polypropylene, solid polyurethane, and solid polypropylene. The protective jacket is extruded or wound about the first insulation layer and is produced from a material selected from the group consisting of high density polyethylene and a fiber reinforced plastic. The third layer comprises a means for creating a non-smooth outer surface so as to increase the friction between the insulation and its environment. The means for creating a non-smooth surface is selected from a group consisting of a plastic winding wound about the protective jacket, a plastic winding wound about the protective jacket and recessed therein, a plastic mesh, a metal mesh, polymeric beads, and polymeric pellets.

This aspect of the invention may include one or more of the following features, alone or in any combination. The means for creating a non-smooth outer surface may be a polymeric winding having a nominal winding pitch of about 75 mm. Opposing ends of the tubular conduit may be exposed wherein opposing lengths of the outer surface of the tubular conduit are exposed. Opposing ends of the environmental coating may be exposed wherein opposing lengths of the environmental coating are exposed. Opposing ends of the protective jacket may be exposed wherein opposing lengths of the protective jacket do not have the means for creating a non-smooth surface on surfaces thereof. The opposing ends of the protective jacket may each have a wind down end seal of a hot melt adhesive or adhesive tape.

Another aspect of the present invention is directed to a pipe for carrying fluid comprising a tubular conduit, an environmental coating, a first insulation layer and an outer layer. The tubular conduit defines a passageway for fluid flow and has an outer sidewall surface. The environmental coating is deposited on the outer sidewall for providing resistance against an environmental factor. The first insulation layer is deposited about the tubular conduit and the environmental coating. The protective jacket is extruded or wound about the first insulation layer. The outer layer comprises a means for creating a non-smooth outer surface so as to increase the friction between the insulation and its environment. The tubular conduit has a 508 mm (20 inches) outside diameter, a 15 mm (0.591 inches) wall thickness and 12 m (40 feet) length and a 0.41 mm+0.20 mm/−0.05 mm (16 mils+8 mils/−2 mils). The environmental coating is cut back a length of about 120 mm+25 mm/−0 mm (4.75 inches+1 inch/−0 inches) at both ends of the tubular conduit. The first insulation layer is a polyurethane insulation having a thickness of about 22 mm+6 mm/−3 mm (0.87 inches+¼ inches/−⅛ inches) at 240 kg/m³ (15.0 lb/ft³) nominal density. The protective jacket has a thickness of at least about 5 mm (0.200 inches). The protective jacket is cut back a length of about 370 mm+25 mm/−0 mm (14.56 inches+1 inch/−0 inches) from the tubular conduit at opposing ends. Opposing ends of the protective jacket have a wind down end seal with about 50 mm (2 inches) wide of a hot melt adhesive. The protective jacket has opposing transitional end portion lengths of about 100 mm+25 mm/−0 mm (4 inches+1 inch/−0 inches) with a minimum end length of about 75 mm (3 inches). The means for creating a non-smooth surface comprises a 4 mm (5/32 inches) diameter polyethylene rod embedded into the protective jacket at least 2 mm (0.079 inches) deep. The polyethylene rod is wound about the protective jacket with a nominal pitch of about 75 mm (3 inches). Opposing ends of the protective jacket are left bare (without the rod) to a length of about 450 mm (18 inches).

This aspect of the invention may include one or more of the following features, alone or in any combination. The first insulation layer may be produced from a material selected from a group consisting of polyurethane foam, glass syntactic polyurethane, glass syntactic polypropylene, solid polyurethane, and solid polypropylene. The protective jacket may be extruded or wound about the first insulation layer and may be produced from a material selected from the group consisting of high density polyethylene and a fiber reinforced plastic. The means for creating a non-smooth surface may be selected from a group consisting of a plastic winding wound about the protective jacket, a plastic winding wound about the protective jacket and recessed therein, a plastic mesh, a metal mesh, polymeric beads, and polymeric pellets.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
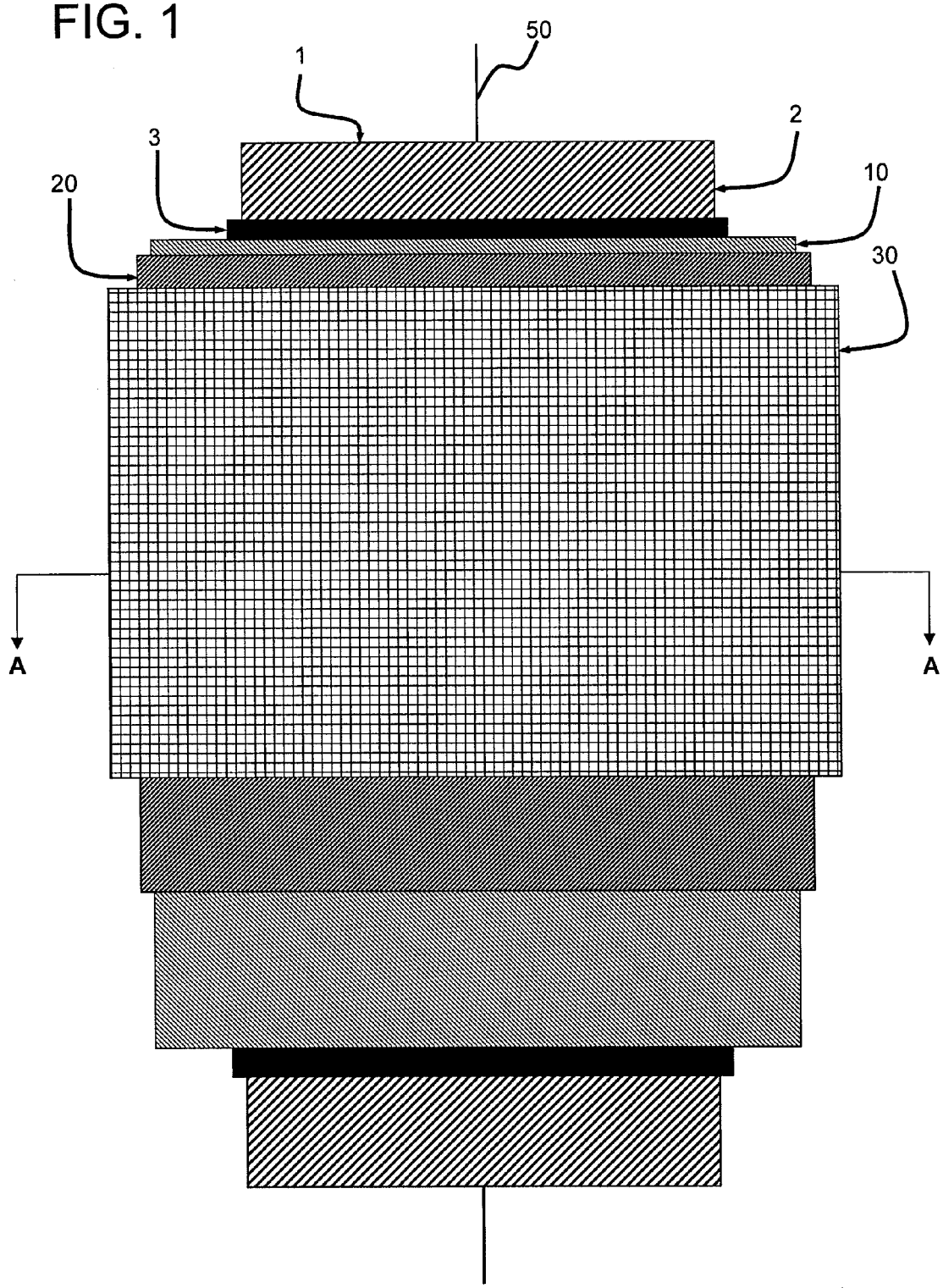
FIG. 1 shows a side elevation view (not to scale) of a pipeline made in accordance with the teachings of the present invention.
Figure 1A:
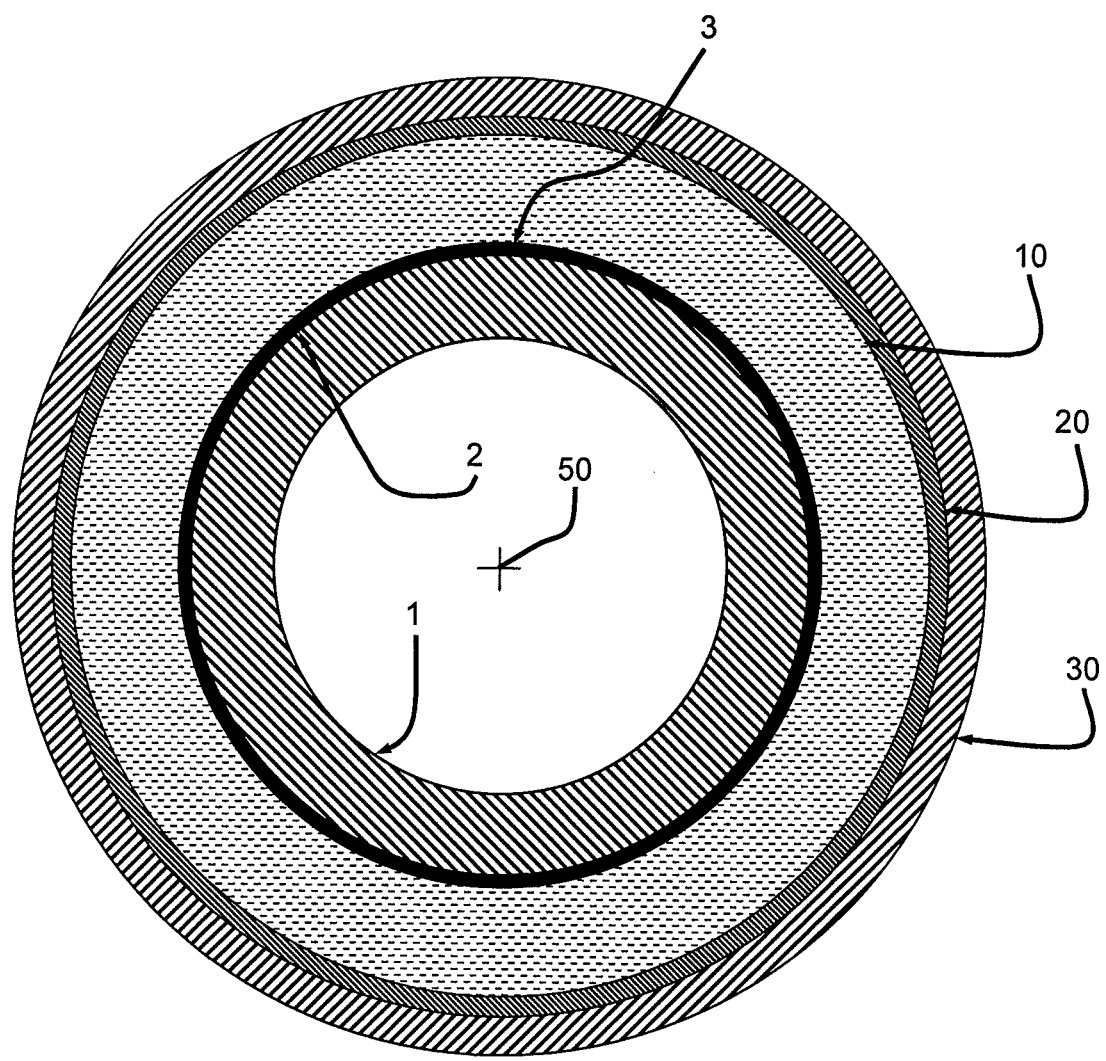
FIG. 1A shows a cross-section (not to scale) taken perpendicular to a center axis running parallel to a length of the pipe and along A-A of FIG. 1 of the pipeline made in accordance with the teachings of the present invention; and, FIG. 2 shows a detailed side elevation view (not to scale) of the pipe made in accordance with the teachings of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention is directed to a multilayer insulation system that employs a mechanism to increase the friction between insulation layers and/or the outer layer of the insulation or jacket and the surrounding environment, e.g., soil or concrete. It should be recognized the invention will work with insulation systems that include protective jackets around the insulation. Specifically, the use of protective jackets prevents mechanical damage to the insulation and prevents water from contacting the insulation resulting in a better performing insulation product.

In addition to using the present insulation around pipes carrying fluids in underground, marine, or subsea applications the present product can be used in cryogenic applications, such as pipes carrying cold or liquefied gases (argon, nitrogen, helium, hydrogen and oxygen) and other cold fluids or liquefied gases having extremely low temperatures (−60° C. to −266° C.).

Note that while the discussion herein centers around pipes, it is recognized that other pipe components, such as joints, elbows, bends, tees, wyes, couplers, etc. can be insulated in the manners discussed herein.

The Pipe 1

Typically, a fluid conduit 1 (e.g., pipes), conventionally made of steel, has a nominal diameter of between 1" and 72" through a center axis 50 and comprises an outer surface 2 with an optional anticorrosion coating 3 thereon and one or more insulation layers disposed on the anticorrosion coating surface. Adjacent the pipe are the following layers:

The First Layer 10—An Insulation

The first layer is single or multiple layers of similar or different insulation materials, such as a polyurethane foam (PUF), glass syntactic polyurethane (GSPU), solid polyurethane (SPU), glass syntactic polypropylene (GSPP) or solid polypropylene (SPP) 10. The method of molding the GSPU is disclosed in another patent application, U.S. patent application for "Method and System for Cast Molding a Fluid Conduit," U.S. application Ser. No. 11/137,626, filed May 25, 2005, naming Robert Appleby, Glen Pfanner and Billy Ervin as inventors. This application and the disclosure therein is incorporated by reference. The insulation is applied to a substantially uniform radial thickness and cured or cooled to form a rigid form. Preferably, the insulation has a thickness of between about 0.50 inches and 8 inches. This molding may occur in either a static or a progressive mold. The insulation can also be extruded or sprayed on to the pipe. The insulation will then cure or cool. During the molding, extruding or spraying process and while curing or cooling, the second layer, discussed in the next section, can be applied to the outer surface of the insulation. The second layer will thus bond to the insulation.

The Second Layer 20—A Jacket

A jacket 20 may be applied to the outer surface of the first insulation 10. A typical jacket is a high density polyethylene coating (HDPE) 20 which is extruded around the insulated pipe. The thickness of the jacket is typically 2 mm-12 mm. This layer 20 protects the insulation 10 along with the pipe 1. The jacket may also include a bonding film to enhance adhesion between the insulation and jacket. The ends of the jacket layer 20 may be cut off at the ends or the layer carried over the ends of the insulation 10 and sealed to the pipe 1 and its anticorrosion coating 3.

The outer jacket may also be Fiberglass Reinforced Plastic (FRP) among others. Specifically, other polymers or similar coatings may also be used to reduce corrosion by protecting the pipe from groundwater and other elements/materials.

The Third Layer 30—A Winding, Beads or Pellets

The third layer 30 (or second layer if no jacket is used) is a winding placed around the warm or hot insulation or jacket while it is still curing or cooling. Preferably, the winding is a plastic wire evenly and spirally wound, e.g., equal spacing between the winds along the length of the insulated pipe. This winding creates an uneven, bumpy or undulating surface.

Figure 2:
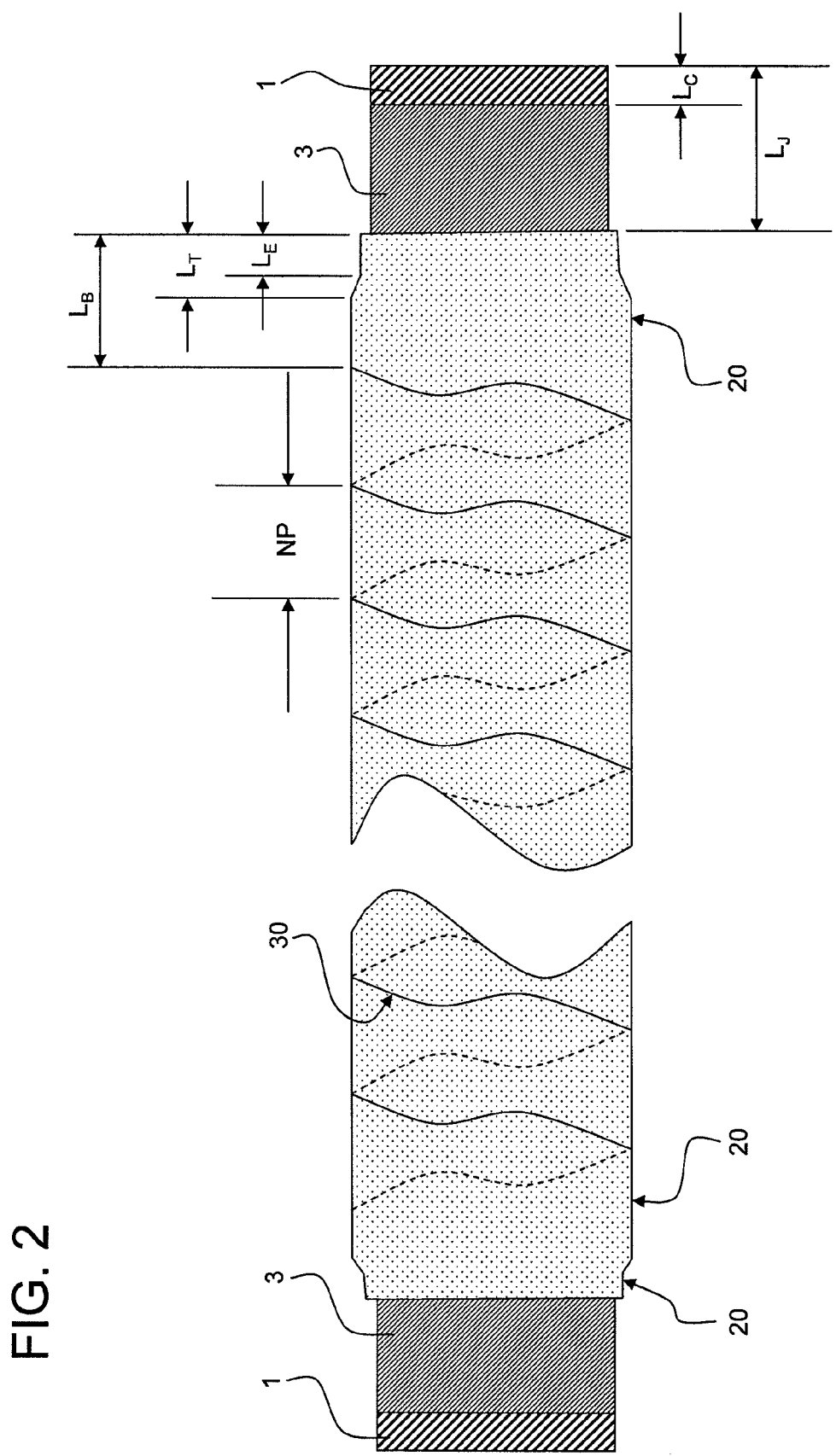

This layer may also be a polymer (e.g., plastic) or metal mesh or net. (See FIG. 1). Preferred materials include polyethylene (PE) wire or pellets or polypropylene (PP) wire and/or pellets and/or beads. (See. FIG. 2).

A further approach is to embed beads or pellets, such as polyethylene (PE) or polypropylene (PP) beads or pellets into the warm, curing outer insulation surface or jacket (10 or 20). Such beads or pellets are laid like the wire above or randomly, evenly around the insulation or jacket. Preferably, such beads or pellets are laid randomly to the outer surface of the insulation or jacket.

Tests have shown wire diameter or bead or pellet diameter (pellet size) of $1/16"$ to $1/2"$ works best.

Additional properties may be added to the corrosion coating layer, such as a rough coat.

The primary purpose is to create a non-smooth surface, such as an uneven, bumpy or undulating surface so as to increase the friction between insulation layers and/or the insulation or jacket and its environment. This is accomplished by applying the windings, beads or pellets to the hot or warm insulation or jacket while it is curing or cooling.

Other System Features—Field Joints

For the insulation system to be effective, it must also provide for the continuity across the joints where pipe segments are welded together. Field joints are provided for this purpose comprising a layer of insulation, bonded to the pipe and its anticorrosion coating and spanning from the insulation of one pipe segment to the next segment. A final jacket sleeve can then fitted over the field joint and shrunk, welded or bonded into tight contact with the insulation or jacket underneath. Thus, a continuous uninterrupted protective jacket is created.

Alternative Embodiments

The windings, beads, pellets or mesh 30 can also be applied between layers of insulation or on the outside surface of the insulation on a non-jacketed insulated pipe or can be added to the outer surface of the jacket 30. This will increase the friction between the insulated pipe and the surrounding environment, earth, concrete, etc. to improve the overall system.

Other System Features—Bonding

Each layer from the steel pipe up to the outermost surface (e.g., protective jacket) can be bonded to each adjacent layer. Handling and deployment of the insulated system requires gripping the system and restraining it when necessary. Any slippage between layers results in loss of restraint and control, and possibly wrinkling and damage to the system. Continuous bonding is a unique and valuable feature of the described system.

Practical Example

A practical example of the teachings of the present invention may be understood by referring to FIG. 2. The dimensions disclosed with example are meant as an illustration of a specific embodiment, and the broader aspects of the invention are not limited by the specificity with which the following example is described. For instance, in practicing the invention, any one of the specific physical qualities and/or magnitudes thereof described with reference to the practical example may be taken alone or in combination with or with any of the aspects described above to arrive at a useful pipe system of the present invention.

In FIG. 2, a pipe system is illustrated having an insulation layer 10 under (concealed by) an insulation jacket 20. A pipe 1 was supplied having a 508 mm (20 inches) outside diameter, a 15 mm (0.591 inches) wall thickness and 12 m (40 feet) length and a 0.41 mm+0.20 mm/−0.05 mm (16 mils+8 mils/−2 mils) FBE with Rough-Cote layer. The FBE was cut back a length $L_C$ of about 120 mm+25 mm/−0 mm (4.75 inches+1 inch/−0 inches) at both ends of the pipe 1. The pipe 1 included 22 mm+6 mm/−3 mm (0.87 inches+¼ inches/−⅛ inches) polyurethane insulation at 240 kg/m$^3$ (15.0 lb/ft$^3$) nominal density with a 5 mm (0.200 inches) minimum HDPE jacket 20 such that the system had about a 563 mm (22.17 inches) nominal diameter. The HDPE jacket was cut back a length $L_J$ of about 370 mm+25 mm/−0 mm (14.56 inches+1 inch/−0 inches) from the pipe 1 at both ends. Opposing ends of the HDPE jacket 20 had a wind down end seal with a 50 mm (2 inches) wide hot melt adhesive. The HDPE jacket had an overall transitional end portion length $L_T$ of about 100 mm+25 mm/−0 mm (4 inches+1 inch/−0 inches) with a minimum end length $L_E$ of about 75 mm (3 inches). A 4 mm (5/32 inches) diameter polyethylene rod 30 was embedded into the HDPE jacket at least 2 mm (0.079 inches) deep with a nominal pitch NP of 75 mm (3 inches). Each end of the HDPE jacket 20 was left bare (without rod 30) to a length $L_B$ of 450 mm (18 inches).

As used herein, the terms "first," "second," "third," etc. are for illustrative purposes only and are not intended to limit the embodiments in any way. Additionally, the term "plurality" as used herein is intended to indicate any number greater than one, either disjunctively or conjunctively as necessary, up to an infinite number.

While the specific embodiments have been illustrated and described, numerous modifications come to mind without significantly departing from the spirit of the invention, and the scope of protection is only limited by the scope of the accompanying Claims.

What is claimed is:

1. A steel pipe for carrying fluid comprising:
    a tubular conduit (1) defining a passageway for fluid flow and having an outer sidewall surface (2);

an environmental coating (3) deposited on the outer sidewall (2) for providing resistance against an environmental factor wherein a first insulation layer (10) deposited about the tubular conduit (1) and the environmental coating (3), the first insulation layer (10) produced from a material selected from a group consisting of polyurethane foam, glass syntactic polyurethane, glass syntactic polypropylene, solid polyurethane, and solid polypropylene;

a protective jacket (20) about the first insulation layer (10) produced from a material selected from the group consisting of polyethylene and a fiber reinforced plastic; and a third layer (30) comprising a polymeric winding having a nominal winding pitch (NP) of about 75 mm so as to increase the friction between the insulation and its environment, the means for creating a non-smooth surface selected from a group consisting of a plastic winding wound about the protective jacket, a plastic winding wound about the protective jacket and recessed therein, a plastic mesh, a metal mesh, polymeric beads, and polymeric pellets.

2. A steel pipe for carrying fluid comprising:

a tubular conduit (1) defining a passageway for fluid flow and having an outer sidewall surface (2);

an environmental coating (3) deposited on the outer sidewall (2) for providing resistance against an environmental factor wherein a first insulation layer (10) deposited about the tubular conduit (1) and the environmental coating (3), the first insulation layer (10) produced from a material selected from a group consisting of polyurethane foam, glass syntactic polyurethane, glass syntactic polypropylene, solid polyurethane, and solid polypropylene;

a protective jacket (20) about the first insulation layer (10) produced from a material selected from the group consisting of polyethylene and a fiber reinforced plastic and opposing ends of the protective jacket (20) each have a wind down end seal of a hot melt adhesive and being exposed wherein opposing lengths ($L_B$) of the protective jacket (20) do not have the means for creating a non-smooth surface on surfaces thereof; and a third layer (30) comprising a means for creating a non-smooth outermost surface so as to increase the friction between the insulation and its environment, the means for creating a non-smooth surface selected from a group consisting of a plastic winding wound about the protective jacket, a plastic winding wound about the protective jacket and recessed therein, a plastic mesh, a metal mesh, polymeric beads, and polymeric pellets.

* * * * *